March 5, 1957     L. J. KAMM     2,784,359
DIGITAL CURVE GENERATOR

Filed Sept. 22, 1953     3 Sheets-Sheet 1

United States Patent Office 2,784,359
Patented Mar. 5, 1957

2,784,359

DIGITAL CURVE GENERATOR

Lawrence J. Kamm, Forest Hills, N. Y., assignor to Sperry Products, Inc., Danbury, Conn., a corporation of New York Application September 22, 1953, Serial No. 381,586

5 Claims. (Cl. 318—28)

This invention relates to curve generators such as are used on machine tools or plotting boards and in particular to those in which the data is supplied in digital form.

Until recently when it was desired to machine a curved surface, such as a cam, it has been necessary either to machine a series of points on that surface and finish the work by hand or to prepare a master by hand and use a tracer type of machine to reproduce it in quantity.

There have recently been developed machines which machine curves directly from digital data. Such data is usually supplied in the form of perforated tape or punched cards. Such machines in their present form have several serious disadvantages.

The first of these is complexity. Machines now in existence use complex control systems with large numbers of relays and vacuum tubes, analog or digital computers, etc. This results both in excessive first cost and much specially skilled maintenance.

The second is excessive labor requirements in data preparation. This applies only to those machines having no interpolating means to control the shape of the curve between the initially specified points. For such machines large numbers of interpolated points must be calculated. Machines with integral interpolators require much less preparation but pay for this advantage with the cost of interpolating computers. In both cases the data must first be prepared in the form of tape or cards and fed automatically.

The third is the absence of simple function generating means such as uniform slope, dwell of one coordinate while the other changes, and circle arcs which make up a large fraction of the length of curves such machines are called upon to generate.

The fourth is the absence of a uniform cutting feed regardless of the position or slope of the cut.

It is an object of this invention to overcome these and other disadvantages by making a machine of relatively simple construction and ease of maintenance which requires a minimum of data preparation, includes interpolating means, means to generate linear and circular functions, means to produce uniform or controlled cutting feed, and means to accept data in different forms.

It is a further object of the invention to be adaptable to plotting boards and other devices in addition to machine tools.

The invention accordingly comprises an article of manufacture possessing the features, properties, and the relation of elements which will be exemplified in the articles hereinafter described and the scope of the application of which will be indicated in the claims.

For a fuller understanding of the nature and objects of the invention, reference should be had to the following detailed description taken in connection with the accompanying drawings, in which.

Figure 1:
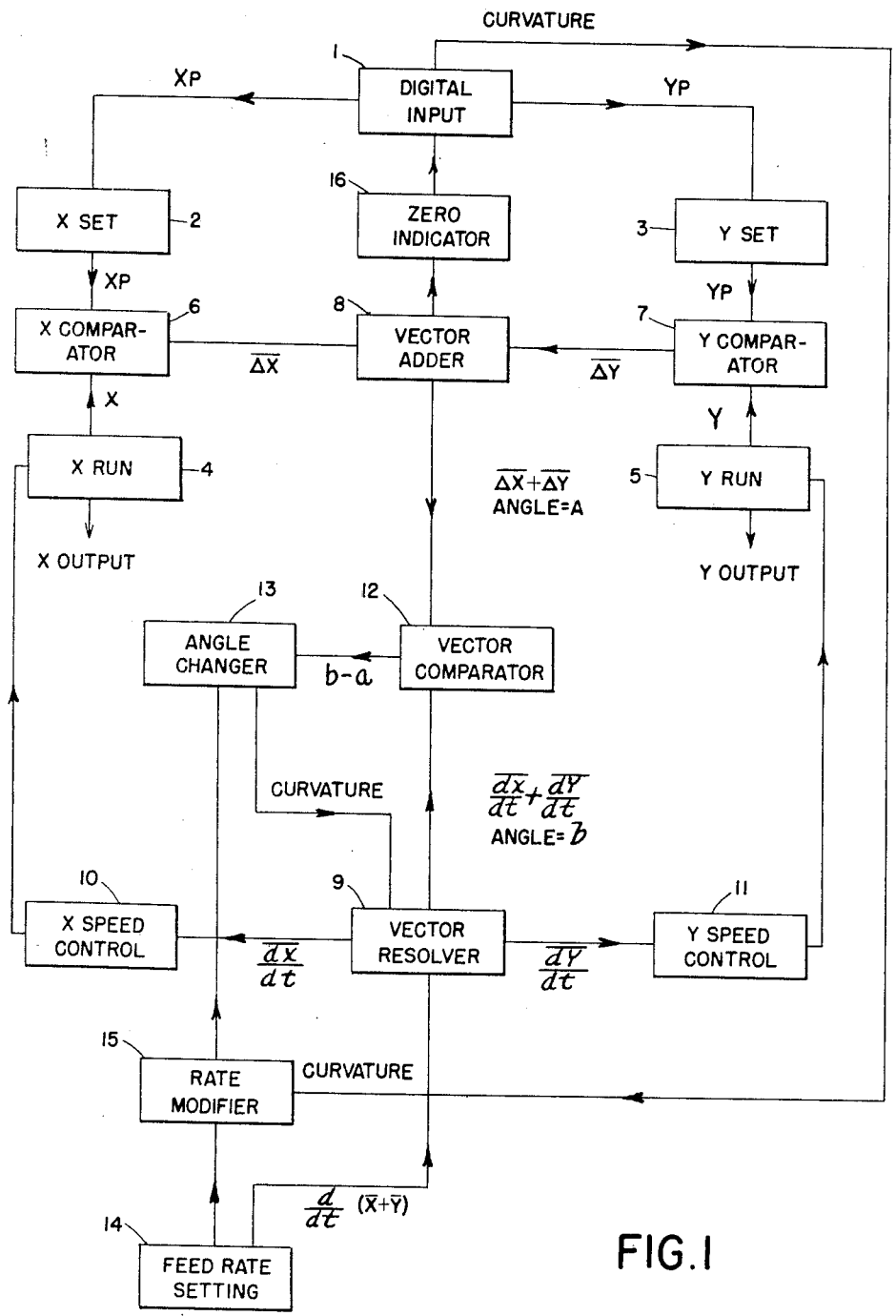
Fig. 1 is a generalized functional block diagram of the system.
Figure 2:
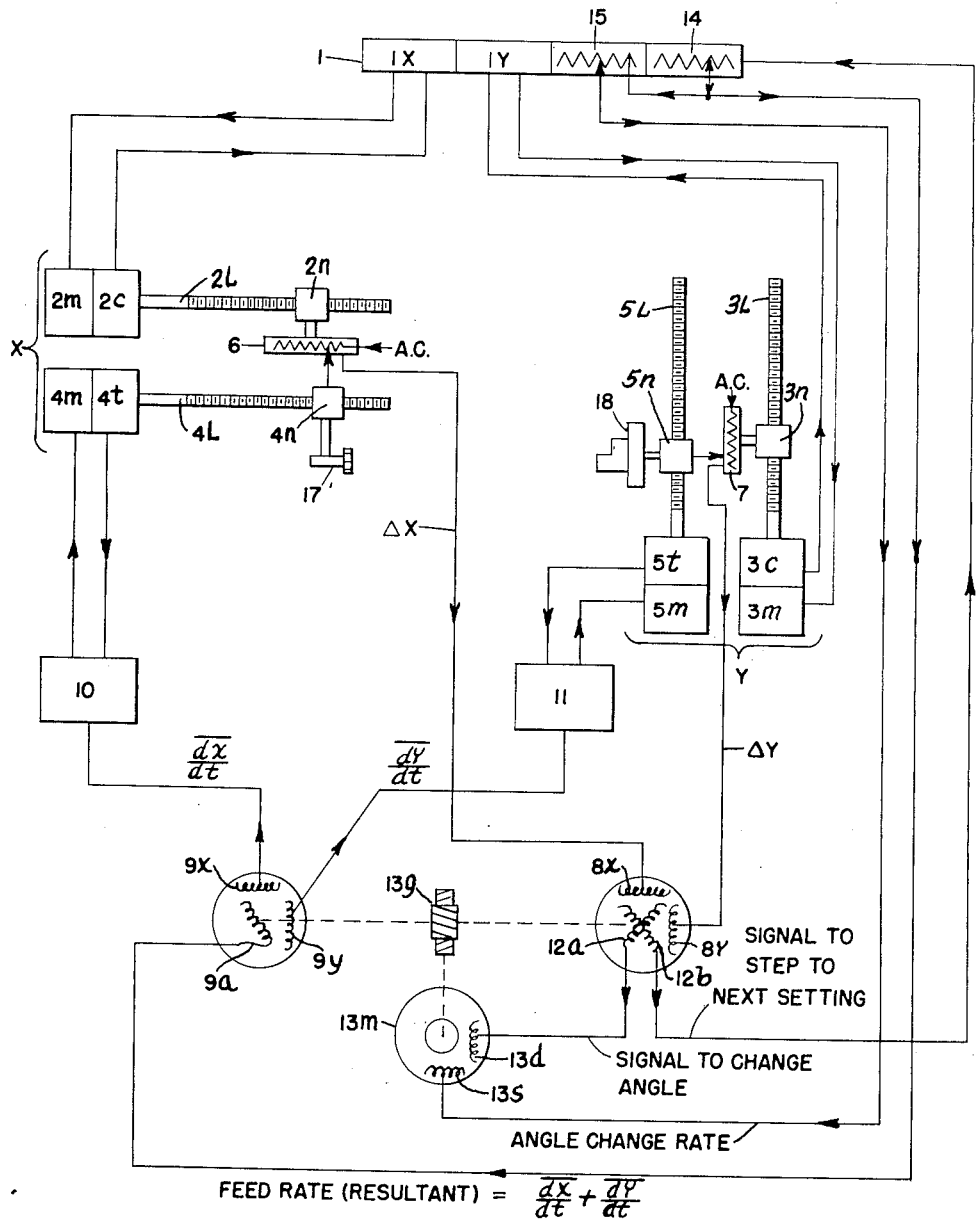
Fig. 2 is a more detailed block diagram of one embodiment of the system.

Both Figs. 1 and 2 have similar detail numbers and both may be studied together in following the description.

In Fig. 2 it is assumed that the machine being controlled is a form of milling machine in which the work 18 is moved in one direction (called the Y direction) by travelling nut $5n$ on lead screw 5L while the milling cutter 17 is moved in a direction (the X direction) at right angles to the Y direction by travelling nut $4n$ on lead screw 4L.

This assumption is arbitrary and the invention will operate equally well with machines having other types of action and other forms of coordinates. For example, X could be the longitudinal feed of a lathe carriage and Y the cross feed, or X could be the angular feed of a cam milling machine and Y the radial feed. Also the invention may be applied to a machine in which three or more coordinates are simultaneously varied.

Neither coordinate is considered the independent variable but both are parametric functions of time or other independent variable. This principle makes the machine accuracy independent of the slope of the curve being cut and eliminates ambiguities due to two points of the curve having the same value for one coordinate.

Parallel to the machine operating screws and nuts 4L, $4n$ and 5L, $5n$ are point setting screws and nuts 2L, $2n$ and 3L, $3n$. When the machine operates, the point setting nuts are moved from one set of coordinates to the next with no attempt at interpolation. They convert the digital data into physical position and in Fig. 1 are called the X setting unit 2, and the Y setting unit 3.

After X and Y are set, the machine drive screws 41 and 5L are operated to make the machine parts approach the setting at controlled variable rates. It is this control which generates the interpolation. The machine drive is generalized in Fig. 1 as X run 4 and Y run 5.

Figure 3:
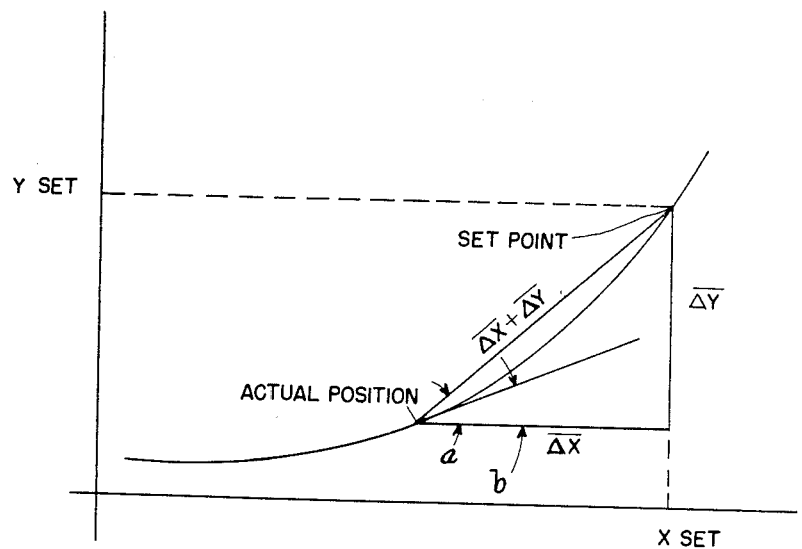
Fig. 3 is a set of schematic curves showing the action of the machine.

Between each setting unit and its running unit is a comparator 6, 7 which responds to the instantaneous difference in position between the setting unit and the running unit. These comparators may be potentiometers as indicated in Fig. 2 or inductive, capacitive, synchro, pneumatic, or other types of displacement sensitive devices. The outputs of these devices are vector quantities whose magnitudes $\Delta X$ and $\Delta Y$ are proportional to the X and Y displacements and whose directions are the directions of X and Y. If the cutter moved along the vector sum of $\Delta X$ and $\Delta Y$ (relative to the work) it would generate a straight line (in rectangular coordinates) or a spiral (in polar coordinates) which would pass through the set point. In Figure 3 this is shown in graphical form. The system described herein can be set to do this to generate straight lines (or spirals). However if this were the only action of the machine, it would never generate a curve but only a polygon with corners on the curve at the set points.

Note that the vectors are based on actual tool position and on set point position. In effect the tool "homes" onto each set point as a missile might "home" onto a target. The set point may be referred to as the target point. Thus no error of calibration, component inaccuracy, or similar effect can make the finished curve deviate from the series of set points which define it. This action is maintained through all the interpolation and function generating actions of the system.

The operation of a setting screw in response to digital data is preferably, though not necessarily, by the Digital Servomechanism described in my copending application Serial No. 376,509, filed August 25, 1953. As shown schematically in Fig. 2, 1X and 1Y are the digital input devices for setting X and Y corresponding to the tape and diode circuit of the copending application. $2m$ and $3m$ are the setting motors with their attendant feeding amplifiers, and $2c$ and $3c$ are the commutator position converters which feed back the position of the feed screw in digital form.

The X run and Y run units 4 and 5 (Fig. 1) each comprise a motor $4m$ and $5m$ and a feedback means $4t$ and $5t$ to indicate speed. These may be tachometer generators, the back E. M. F. of the motor armatures if the motors are D. C., or other means. X speed control 10 and Y speed control 11 combine with running units 4 and 5 to form velocity servomechanisms which run the X and Y outputs at speeds proportional to the $dX/dt$ and $dY/dt$ signals fed into them.

$dX/dt$ and $dY/dt$ are the outputs of a vector resolver 9 which may be in the form of a control transformer having stator windings $9x$ and $9y$ (Fig. 2) in quadrature and rotor winding $9a$. A voltage from feed rate setting 14 in the digital input 1 establishes the resultant speed which is then resolved into its X and Y components $dX/dt$ and $dY/dt$. Thus the cutting feed is maintained constant regardless of how it is divided into X and Y components. For polar coordinate machines this voltage may be modified by a potentiometer or other device on the radial feed in combination with a similar device on the angle setting shaft to maintain uniform linear feed.

In order to combine $\Delta X$ and $\Delta Y$ into their vector sum so that the sum can be used to direct the machine, a vector adder 8 is used. This may take the form of the two quadrature stator windings $8x$ and $8y$ of a control transformer. The vector sum appears as the magnetic field of the control transformer.

The $\Delta X + \Delta Y$ vector angle $a$ (direction from cutter toward target point as shown in Fig. 3) is compared with the $dX/dt + dY/dt$ vector angle $b$ (actual direction of cutter) by vector comparator 12 which may be in the form of control transformer rotor winding $12a$ connected mechanically to control transformer winding $9a$ so that its axis relative to its stator is 90° from the axis of $9a$ relative to its stator. Thus if angle $b$ equals angle $a$, then zero voltage is induced in $12a$. If angle $b$ is different from angle $a$, then a voltage will be induced in $12a$ and its phase will be determined by the direction of the difference.

It is desired to change angle $b$ to make it approach angle $a$, i. e., to change the direction of the cutter to make it head for the set point. It is also desirable to change $b$ gradually and continuously so that the cutter will move approximately along the curve instead of along a secant.

To accomplish this, angle changer 13 is provided. This may take the form of a two phase servomotor $13m$ having one phase $13s$ fed from a fixed voltage from section 15 of input unit 1 and having the other phase $13d$ fed from winding $12a$. When a voltage is induced in $12a$ because of a difference between $b$ and $a$, $13d$ is energized and the motor rotates the two control transformers with gears $13g$ until the voltage in $12a$ is restored to zero. Thus control transformer $8x$—$8y$—$12a$ and motor $13m$ serve as a servomechanism to make the cutter direction angle $b$ follow target bearing angle $a$.

The speed of rotation of motor $13m$ corresponds to the curvature of the generated curve, i. e., it is the rate of change of slope with displacement along the curve. If the motor is made to run at a fixed speed, the generated curve becomes a circle arc. This can be accomplished by making the output of $12a$ operate an on-off relay.

If the output of $12a$ feeds $13m$ directly or through a linear amplifier, the curve will be one of varying curvature.

The speed of motor $13m$ is also determined by the fixed voltage on field $13s$. For very accurate curve following, this voltage can be set point by point by the digital controller to correspond to the curvature of the curve between each pair of set points. If the output of $12a$ acts through a relay as above, the finished curve will be a series of circle arcs tangent to each other and to the original curve at the set points.

Other means may be introduced into the input to motor $13m$ to further modify the interpolating and function generating actions.

Since the curvature is varied continuously in the manner shown, no sharp corners are produced in the finished curve. If a sharp corner is desired, it may be produced by setting the feed to zero for one step and running the curvature motor alone until the new slope is reached.

Rotor winding $12b$ is at right angles to winding $12a$ and therefore has induced in it a voltage proportional to the total distance of the cutter from the set point. When the set point is reached, this voltage reaches zero. Thus winding $12b$ in this embodiment acts as zero indicator 16 and signals to the digital input 1 that the data for the next point should be set up.

The digital input can be in the form of punched cards or tape fed manually or automatically or it can be in the form of manually operated pushbuttons or dial switches, or it can be in any other digital form. For repeated production, automatic feed is desirable, but for one of a kind production pushbuttons or dial switches at the machine operated by the machine operator from written tables eliminates both the labor of tape or card preparation and the investment in their associated machines.

Much of the above description is based on the assumption that the machine has only two coordinates operating at one time with a third coordinate, if it exists, being separately set and held constant during the generation of a two coordinate curve. This limitation is not necessary to the system. Three coordinates can be run simultaneously to produce a three dimensional curve or its equivalent. One method of doing this is to make a second system substantially the same as the one described above but relating the third coordinate with either one of the other two. An additional servo is required to modify the resultant speed setting input to the second system to maintain its output for the common coordinate at the same magnitude as the corresponding output of the first system.

I claim:

1. A curve generator comprising digital input means, two point coordinate setting means responsive to said input means, machine parts having motion coordinates corresponding to said point coordinates, running means moving said machine parts on their motion coordinates, two comparator means having voltage outputs proportional to the differences in position between said setting means and said running means, a first control transformer comprising two quadrature field windings and at least one armature winding, said field windings being connected to said comparator means voltage outputs, a second control transformer comprising two quadrature field windings and at least one armature winding, means to establish a voltage corresponding to the vector sum of the speeds of said running means, said voltage being connected to the armature winding of said second control transformer, voltage responsive speed control means for said running means, said speed control means being connected to said quadrature windings of said second control transformer, a motor, means mechanically coupling said motor, said first control transformer, and said second control transformer, and controlling means controlling the speed of said motor, said controlling means being connected to the armature winding of said first control transformer.

2. A curve generator comprising a plurality of elements, each element comprising digital input means, setting means responsive to said input means, running means, and comparator means responsive to the differences in position between said setting means and said running means, means for combining the responses of the comparator means of said elements, speed resolving means for controlling said running means, and means whereby said combining means controls said speed resolving means.

3. A curve generator comprising digital input means, machine parts having a first set of displacements establishing a machine position, point setting means having a second set of displacements establishing a setting position, comparator means having outputs responsive to the difference between said machine position and said setting position, means to combine said outputs to establish a resultant output having magnitude and direction, means establishing speed magnitude, means establishing speed direction for said machine position, means resolving said speed magnitude into components corresponding to said first set of displacements, running means for said first set of displacements responsive to said components, means comparing said speed direction with said resultant output direction and producing a signal corresponding to the difference between said directions, and means responsive to said signal to turn said speed direction toward said resultant output direction.

4. A curve generator as specified in claim 2, having separate means to vary the rate at which said combining means controls said speed resolving means.

5. A curve generator as specified in claim 2, having means responsive to said combining means and controlling said digital input means.

References Cited in the file of this patent
UNITED STATES PATENTS

| 2,630,552 | Johnson | Mar. 3, 1953 |
| 2,673,951 | Morel | Mar. 30, 1954 |

OTHER REFERENCES

"Punched tape guides milling machine," J. O. McDonogh, Electronics. April 1953, pp. 135–137, Figs. 1, 2 and 3.